United States Patent [19]

Richter et al.

[11] Patent Number: 4,824,595

[45] Date of Patent: * Apr. 25, 1989

[54] POLYISOCYANATE COMPOSITIONS CONTAINING REVERSIBLY BLOCKED CATALYSTS, A PROCESS FOR THEIR PRODUCTION, THEIR USE IN THE PRODUCTION OF POLYURETHANE PLASTICS AND ADDITION PRODUCTS OF SULFONYL ISOCYANATES WITH CATALYSTS HAVING A TIN(II)- OR TIN(IV)-CARBOXYLATE

[75] Inventors: Roland Richter, Cologne; Hanns P. Muller, Odenthal; Rudolf Hombach, Leverkusen; Manfred Dollhausen, Odenthal; Geza Avar, Leverkusen; Hans-Albrecht Freitag, Bergisch-Gladbach, all of Fed. Rep. of Germany

[73] Assignee: Bayer Aktiengesellschaft, Bayerwerk, Fed. Rep. of Germany

[*] Notice: The portion of the term of this patent subsequent to Jan. 27, 2004 has been disclaimed.

[21] Appl. No.: 633,732

[22] Filed: Jul. 23, 1984

[30] Foreign Application Priority Data

Jul. 22, 1983 [DE] Fed. Rep. of Germany ....... 3326566

[51] Int. Cl.$^4$ ................................................. C09K 3/00
[52] U.S. Cl. ............................ 252/182.17; 252/182.2; 252/182.21; 252/182.22
[58] Field of Search ............... 252/182, 188.31, 182.17, 252/182.2, 182.21, 182.22; 556/90; 502/167, 170

[56] References Cited

U.S. PATENT DOCUMENTS

| | | | |
|---|---|---|---|
| 3,330,849 | 7/1967 | Ulrich | 260/453 |
| 3,480,656 | 11/1969 | Heiss et al. | 260/429.7 |
| 3,484,466 | 12/1969 | Sayigh et al. | 260/397.7 |
| 3,590,002 | 6/1971 | Powers | 252/182 |
| 3,706,687 | 12/1972 | Rudzki | 252/182 |
| 4,065,410 | 12/1977 | Schäfer et al. | 252/182 |
| 4,113,734 | 9/1978 | Smets et al. | 260/308 |
| 4,517,133 | 5/1985 | Reich | 260/545 |
| 4,520,042 | 5/1985 | Smith | 427/209 |
| 4,547,478 | 10/1985 | Chang | 502/167 |
| 4,565,648 | 1/1986 | Kopp et al. | 252/397 |
| 4,574,793 | 3/1986 | Lee et al. | 252/182 |
| 4,582,861 | 4/1986 | Galla et al. | 252/182 |
| 4,638,795 | 1/1987 | Richter et al. | 128/90 |

OTHER PUBLICATIONS

Verlag Chemie, GmbH 1977, R. Appel and M. Montenarh, pp. 2368–2373.

Primary Examiner—Edward A. Miller
Attorney, Agent, or Firm—Gene Harsh; Joseph C. Gil; Thomas W. Roy

[57] ABSTRACT

The present invention relates to polyisocyanate compositions containing reversibly blocked catalysts for the isocyanate addition reaction, characterized in that they contain (a) at least one organic polyisocyanate,
(b) at least one addition product dissolved or dispersed in the polyisocyanate compositions, of a sulfonyl isocyanate with a tertiary amine and/or with a catalyst having a tin(II)- or tin(IV)-carboxylate structure as the reversibly blocked catalyst.

The present invention also relates to a process for producing these polyisocyanate compositions and to the use of new polyisocyanate compositions as reactants for compounds containing isocyanate-reactive groups for the production of isocyanate addition products such as polyurethane plastics using a one-component or two-component principle. The present invention finally relates to the latent polyurethane catalysts prepared from a sulfonyl isocyanate and a tin(II)- or tin(IV)-carboxylate.

10 Claims, No Drawings

POLYISOCYANATE COMPOSITIONS CONTAINING REVERSIBLY BLOCKED CATALYSTS AND ADDITION PRODUCTS OF SULFONYL ISOCYANATES WITH CATALYSTS HAVING A TIN(II)- OR TIN(IV)-CARBOXYLATE STRUCTURE

BACKGROUND OF THE INVENTION

1. Field of the Invention

This invention relates to new polyisocyanate compositions which contain in dissolved or dispersed form certain reversibly blocked catalysts for the isocyanate addition reaction and which only develop their catalytic activity under the effect of compounds containing isocyanate-reactive groups, to a process for producing the new polyisocyanate compositions, to their use as reactants for compounds containing isocyanate-reactive groups in the production of polyurethane plastics and to latent tin catalysts suitable for the production of the compositions.

2. Description of the Prior Art

In industrial polyurethane chemistry, for example in the production of polyurethane foams, elastomers, lacquers or adhesives, the catalysis of the isocyanate addition reactions is a crucial factor. A survey of the catalysts normally used and the mechanism on which their action is based can be found in A. Farkas and G. A. Mills, Advan. Catalysis, 13, 393 (1962), J. H. Saunders and K. C. Frisch, Polyurethanes, Part I, Wiley-Interscience, New York, 1962, Chapter VI and K. C. Frisch and L. P. Rumao, J. Macromol. Sci.-Revs. Macromol Chem., C5 (1), 103–105 (1970).

A variety of different catalysts and catalyst combinations is used in the production of polyurethane plastics. The catalysts most widely used on an industrial scale are tertiary amines and metal catalysts, particularly tin salts of organic carboxylic acids. Metal catalysts are highly active for the urethanization reaction, i.e. they bring about a rapid and quantitative reaction of the isocyanate group with the hydroxyl group of the polyether or polyester. By contrast, tertiary amines catalyze both the urethanization reaction and also, preferentially, the isocyanate-water reaction which is responsible, for example, for the rapid hardening of NCO-prepolymers (one-component systems in the surface protection or adhesive field) and for evolution of carbon dioxide in the foam.

The disadvantage of conventional catalysts is that they can only be mixed with the isocyanate component in their effective concentration during the processsing step because otherwise they do not remain stable in storage. The reason for this is that polyisocyanates, particularly prepolymers containing terminal isocyanate groups, show a tendency during storage towards discoloration, towards the formation of reaction products of relatively high viscosity and/or towards the formation of crystalline precipitates under the effect of light, air and/or moisture. These undesirable phenomena are accelerated by the catalysts normally used to such an extent that polyisocyanates containing catalysts of this type must be regarded as unstable.

Accordingly, the object of the present invention is chemically to derivatize the polyurethane catalysts normally used, particularly tertiary amines and tin carboxylates, in such a way that they are present in an inactive form in which they may be dissolved or dispersed in polyisocyanates, particularly isocyanate prepolymers, without affecting their stability in storage and from which they may be spontaneously released again during the processing step.

According to the invention, this object is achieved by the polyisocyanate compositions according to the invention, which are described in detail hereinafter, and by the process according to the invention for their production.

SUMMARY OF THE INVENTION

The present invention relates to polyisocyanate compositions containing reversibly blocked catalysts for the isocyanate addition reaction, characterized in that they contain (a) at least one organic polyisocyanate, (b) at least one addition product dissolved or dispersed in the polyisocyanate composition, of a sulfonyl isocyanate with a tertiary amine and/or with a catalyst having a tin(II)- or tin(IV)-carboxylate structure as the reversibly blocked catalyst.

The polyisocyanate compositions may also optionally contain the auxiliaries and additives known per se from polyurethane chemistry.

The present invention also relates to a process for producing these polyisocyanate compositions which is characterized in that (i) at least one amine containing at least one tertiary amino group and/or (ii) at least one compound having a tin(II)- or tin(IV)-carboxylate structure is reacted at about 0° to 80° C. with an at least equimolar quantity of a sulfonyl isocyanate, based on the tertiary amino groups or the sulfonyl groups of the sulfonyl isocyanate on the other hand, to form an addition product (b), the reaction being carried out either in the entire quantity of the polyisocyanate component (a) or being carried out in the absence of or in only part of the polyisocyanate component (a) and followed by admixture with the entire quantity or remainder of the polyisocyanate component (a). A solvent is optionally present during formation of the addition product or polyisocyanate composition.

The present invention also relates to the use of the new polyisocyanate compositions as reactants for compounds containing isocyanate-reactive groups for the production of isocyanate addition products such as polyurethane plastics using the one-component or two-component principle.

The present invention also relates to the latent polyurethane catalysts suitable for use in the production of the compositions according to the invention, which are characterized in that they are addition products of a sulfonyl isocyanate with a catalyst having a tin(II)- or tin(IV)-carboxylate structure in a molar ratio of isocyanatosulfonyl groups to carboxylate anions of 1:1.

DETAILED DESCRIPTION OF THE INVENTION

Component (a) of the compositions according to the invention contains at least one organic polyisocyanate, i.e. any compound or mixture of compounds which contain at least two organically bound isocyanate groups per molecule. Compounds such as these include both low molecular weight polyisocyanates having a molecular weight below 400 and also modification products of these low molecular weight polyisocyanates having a molecular weight, calculable from the functionality and the content of functional groups, in the range from about 400 to 10,000, preferably in the range from about 600 to 8000 and, more preferably, in the range from about 800 to 5000. Suitable low molecular weight polyisocyanates are, for example those corresponding to the following formula Q(NCO)$_n$ in which n=2-4, preferably 2, and Q is an aliphatic hydrocarbon radical containing from 2 to 18, preferably from 6 to 10, carbon atoms; a cycloaliphatic hydrocarbon radical containing from 4 to 15, preferably from 5 to 10, carbon atoms; an aromatic hydrocarbon radical containing from 6 to 15, preferably from 6 to 13, carbon atoms; or an araliphatic hydrocarbon radical containing from 8 to 15, preferably from 8 to 13, carbon atoms.

Suitable low molecular weight polyisocyanates such as these are, for example, hexamethylene diisocyanate, 1,12-dodecane diisocyanate, cyclobutane-1,3-diisocyanate, cyclohexane-1,3- and -1,4-diisocyanate and mixtures of these isomers, 1-isocyanato-3,3,5-trimethyl-5-isocyanatomethyl cyclohexane, 2,4- and 2,6-hexahydrotolylene diisocyanate and mixtures of these isomers, hexahydro-1,3- and/or 1,4-phenylene diisocyanate, perhydro-2,4'- and/or 4,4'-diphenylmethane diisocyanate, 1,3- and 1,4-phenylene diisocyanate, 2,4- and 2,6-tolylene diisocyanate and mixtures of these isomers, diphenylmethane-2,4'- and/or -4,4'-diisocyanate, naphthylene-1,5-diisocyanate, triphenylmethane-4,4',4"-triisocyanate or polyphenyl polymethylene polyisocyanate of the type obtained by phosgenating aniline-formaldehyde condensates.

Suitable relatively high molecular weight polyisocyanates are modification products of these simple polyisocyanates, i.e. polyisocyanates containing, for example, isocyanurate, carbodiimide, allophanate, biuret or uretdione structural units, of the type obtainable by processes known per se from the polyisocyanates corresponding to the above general formula. Among the relatively high molecular weight, modified polyisocyanates, the prepolymers known from polyurethane chemistry containing terminal isocyanate groups and having a molecular weight in the range from about 400 to 10,000, preferably from about 600 to 8000 and, more preferably, from about 800 to 5000, are of particular interest. These compounds are produced in known manner by reacting excess quantities of simple polyisocyanates of the type mentioned by way of example with organic nitrogen-free compounds containing at least two isocyanate-reactive groups, more particularly organic nitrogen-free polyhydroxyl compounds. Suitable polyhydroxyl compounds of this type are both simple polyhydric alcohols, such as ethylene glycol, trimethylol propane, 1,2-propane diol or 1,2-butane diol, but above all relatively high molecular weight polyether polyols and/or polyester polyols of the type known per se from polyurethane chemistry which have molecular weights of from about 600 to 8000 and preferably from about 800 to 4000 and which contain at least 2, generally from 2 to 8, but preferably from 2 to 4 primary and/or secondary hydroxyl groups. It is of course possible to use NCO-prepolymers of the type obtained, for example, from low molecular weight polyisocyanates of the type mentioned by way of example and less preferred compounds containing isocyanate-reactive groups, such as for example polythioether polyols, polyacetals containing hydroxyl groups, polyhydroxy polycarbonates, polyester amides containing hydroxyl groups or hydroxyl-group-containing copolymers of olefinically unsaturated compounds. Compounds containing isocyanate-reactive groups, particularly hydroxyl groups, which are suitable for producing the NCO-prepolymers are, for example, the compounds disclosed by way of example in U.S. Pat. No. 4,218,543 (herein incorporated by reference) at column 7, line 29 to column 9, line 25. In the production of the NCO-prepolymers, these compounds containing isocyanate-reactive groups are reacted with simple polyisocyanates of the type mentioned by way of example in the foregoing in an NCO:OH equivalent ratio of greater than 1. The NCO-prepolymers generally have an NCO-content of from about 2.5 to 25%, preferably from about 6 to 20%, by weight. In the context of the present invention, "NCO-prepolymers" and "prepolymers containing terminal isocyanate groups" are understood to be both the reaction products as such and also mixtures thereof with excess quantities of unreacted starting polyisocyanates which, in many cases, are also referred to as "semi-prepolymers."

Particularly preferred polyisocyanate components (a) for the process according to the invention are the technical polyisocyanates normally used in polyurethane chemistry, i.e. hexamethylene diisocyanate, 1-isocyanato-3,3,5-trimethyl-5-isocyanatomethyl cyclohexane (isophorone diisocyanate or IPDI), 4,4'-diisocyanatodicyclohexyl methane, 2,4-diisocyanatotoluene and technical mixtures thereof with 2,6-diisocyanatotoluene, 4,4'-diisocyanatodiphenyl methane and mixtures thereof with the corresponding 2,4'- and 2,2'-isomers, polyisocyanate mixtures of the diphenylmethane series of the type obtainable in known manner by phosgenating aniline/formaldehyde condensates, the biuret-group- or isocyanurate-group-containing modification products of these technical polyisocyanates and, in particular, NCO-prepolymers of the above-mentioned type based on these technical polyisocyanates on the one hand and the simple polyols and/or polyether polyols and/or polyester polyols mentioned by way of example on also any mixtures of these polyisocyanates.

Component (b) of the polyisocyanate compositions according to the invention is an addition product (complex) of sulfonyl isocyanates with any tertiary amines and/or tin catalysts containing tin(II)- or tin(IV)-structural units.

Sulfonyl isocyanates suitable for use in accordance with the present invention are any inorganic or organic compounds which contain at least one structural unit corresponding to the following formula

—SO$_2$—NCO

Organic sulfonyl isocyanates are preferably used, those containing aromatically bound isocyanatosulfonyl radicals being particularly preferred. Processes for producing organic sulfonyl isocyanates of the type according to the invention and their chemical behavior are comprehensively described by H. Ulrich in Chem. Rev. 65, pages 369 to 376, 1965. In addition, the production of aryl sulfonyl isocyanates is described in U.S. Pat. Nos. 2,666,787 and 3,484,466. According to the invention, it is possible to use aliphatic, cycloaliphatic and also aromatic mono- or polysulfonyl isocyanates. Examples are methyl sulfonyl isocyanate, butyl sulfonyl isocyanate, cyclohexyl sulfonyl isocyanate, perfluorooctyl sulfonyl isocyanate, phenyl sulfonyl isocyanate, p-toluene sulfonyl isocyanate, benzyl sulfonyl isocyanate, p- chlorophenyl sulfonyl isocyanate, m-nitrophenyl sulfonyl isocyanate, 2,5-dimethylphenyl sulfonyl isocyanate, p-fluorophenyl sulfonyl isocyanate, 2,5-dichlorophenyl sulfonyl isocyanate, 3,4-dichlorophenyl sulfonyl isocyanate, p-bromophenyl sulfonyl isocyanate, p-methoxyphenyl sulfonyl isocyanate, p-nitrophenyl sulfonyl isocyanate, o-nitrophenyl sulfonyl isocyanate, m-phenylene disulfonyl diisocyanate, p-phenylene disulfonyl diisocyanate, 4-methyl-m-phenylene disulfonyl diisocyanate, 2-chloro-p-phenylene disulfonyl diisocyanate, 5-chloro-m-phenylene disulfonyl diisocyanate, 1,5-naphthylene disulfonyl diisocyanate, 3-nitro-p-phenylene disulfonyl diisocyanate, 4-methoxy-m-phenylene disulfonyl diisocyanate, 2,5-furandiyl-bis-(methylenesulfonyl)-diisocyanate, 4,4'-biphenylene disulfonyl diisocyanate, 2,2'-dichloro-4,4'-biphenylene disulfonyl diisocyanate, 3,3'-dimethoxy-4,4'-biphenylene disulfonyl diisocyanate, (methylene-di-p-phenylene)-disulfonyl diisocyanate, (methylene-di-3,3'-dimethoxy-p-phenylene)-disulfonyl diisocyanate, (methylene-di-3,3'-dimethyl-p-phenylene)-disulfonyl diisocyanate, and 2-methyl-p-phenylene disulfonyl diisocyanate. Also suitable are sulfonyl isocyanates containing free NCO-groups, such as m-isocyanatophenyl sulfonyl isocyanate, p-isocyanatophenyl sulfonyl isocyanate, 3-isocyanato-p-tolyl sulfonyl isocyanate, 5-isocyanato-o-tolyl sulfonyl isocyanate, 3-isocyanato-4-methoxy-phenyl sulfonyl isocyanate, 4-isocyanato-3-chloro-phenyl sulfonyl isocyanate, 4'-isocyanato-4-biphenyl sulfonyl isocyanate, 4'-isocyanato-2,2'-dichloro-4-biphenyl sulfonyl isocyanate, 4'-isocyanato-3,3'-dimethoxy-4-biphenyl sulfonyl isocyanate, α-(p-isocyanato-phenyl)-p-tolyl sulfonyl isocyanate, α-(4-isocyanato-3-methoxyphenyl)-2-methoxy-p-tolyl sulfonyl isocyanate, $\alpha^4$-(4-isocyanato-m-tolyl)-2,4-xylyl sulfonyl isocyanate and 5-isocyanato-1-naphthyl sulfonyl isocyanate; or sulfonyl isocyanates containing free isothiocyanate groups, such as p-isocyanatophenyl sulfonyl isocyanate, m-isothiocyanatophenyl sulfonyl isocyanate, 3-isothiocyanato-4-methoxyphenyl sulfonyl isocyanate, and 4-isothiocyanato-3-methylphenyl sulfonyl isocyanates. It is preferred to use sulfonyl isocyanates wherein the —SO$_2$—NCO-group is directly attached to an aromatic radical. Phenyl sulfonyl isocyanate, p-chlorophenyl sulfonyl isocyanate and p-toluene sulfonyl isocyanate (tosyl isocyanate) are particularly preferred. In many cases, it is also advisable to use sulfonyl isocyanates of the type mentioned by way of example which contain either at least two isocyanatosulfonyl structural units or other isocyanate groups in addition to an isocyanatosulfonyl structural unit because polyfunctional compounds such as these (when using the polyisocyanate compositions according to the invention, for example in combination with organic polyhydroxyl compounds) are incorporated into the resulting polyurethane skeleton without chain termination.

In addition to the organic sulfonyl isocyanates mentioned by way of example, it is also possible in accordance with the invention to use inorganic sulfonyl isocyanates, such as for example chlorosulfonyl isocyanate or sulfonyl diisocyanate, of which the production is described, for example, in German Pat. No. 928,896 and in German Pat. No. 1,152,023.

Tertiary amines and tin compounds suitable for the production of component (b) are any of the catalysts known per se from polyurethane chemistry which contain either at least one tertiary amino group or at least one tin(II)- or tin(IV)-carboxylate structural unit. It is preferred to use tertiary amines or tin carboxylates which do not contain any hydroxyl or primary or secondary amino groups, because reactive groups such as these can react off with the sulfonyl isocyanate to form urethane or urea so that more sulfonyl isocyanate is required for reaction with the tertiary nitrogen or with the carboxylate anion to form the adducts essential to the invention. Further, in the presence of H-acid compounds, such as water or hydroxyl compounds, these adducts no longer release the original catalyst, but instead the corresponding derivatized product. However, since this product can still quite easily show catalytic activity, the use of catalysts which contain free OH- or aminic NH-groups in addition to a tertiary nitrogen atom or in addition to the tin carboxylate structure, although less preferred, is not completely excluded. In addition, the tertiary amines or tin compounds suitable for use in accordance with the invention may of course contain any structural units containing heteroatoms which are inert under the conditions of the process according to the invention and which do not cause any problems in the use of the polyisocyanate compositions in accordance with the invention.

The tertiary amines suitable for use in accordance with the invention have a molar weight of generally from about 101 to 6000. The tertiary amines are either isocyanate-free tert. amines having a molecular weight of from about 101 to 600, preferably from about 101 to 300 or isocyanate groups containing tert.-amines having a molecular weight of from about 400 to 6000, preferably from about 500 to 4500.

Examples of suitable tert. amines which are free from isocyanate groups are triethylamine, tributylamine, N-methyl morpholine, N-ethyl morpholine, N,N,N',N'-tetramethylethylene diamine, pentamethyl diethylene triamine and higher homologs (DE-OS Nos. 26 24 527 and 26 24 528), 1,4-diazabicyclo-(2,2,2)-octane, N-methyl-N'-dimethylaminoethyl piperazine, bis-(dimethylaminoalkyl)-piperazines (DE-OS No. 26 36 787), N,N-dimethylbenzylamine, N,N-dimethyl cyclohexylamine, N,N-diethylbenzylamine, bis-(N,N-diethylaminoethyl)-adipate, N,N,N',N'-tetramethyl-1,3-butane diamine, N,N-dimethyl-β-phenyl ethylamine, 1,2-dimethyl imidazole, 2-methyl imidazole, monocyclic and bicyclic amidine (DE-OS No. 17 20 633), bis-(dialkylamino)-alkyl ethers (U.S. Pat. No. 3,330,782, DE-AS No. 10 30 558, DE-OS No. 18 04 361 and DE-OS No. 26 18 280), tertiary amines containing amide groups (preferably formamide groups) according to DE-OS No. 25 23 633 and DE-OS No. 27 32 292), pyridine, aminopyridines such as 4-dimethylamino-pyridine, N,N',N''-tris-(dimethylaminopropyl)-s-hexahydrotriazine, N,N-diethyl cyclohexylamine, N,N,N',N'-tetramethyl methane diamine, 2,2'-sulfo-bis-(N,N-dimethylethylamine), bis-[2-(3'-N,N-dimethylaminopropoxy)ethyl]-ether and N-(3-dimethylaminopropyl)-morpholine. It is also possible to use silaamines containing carbon-silicon bonds, of the type described for example in German Pat. No. 1,229,290, for example 2,2,4-trimethyl-2-silamorpholine and 1,3-diethylaminomethyl tetramethyl disiloxane.

Examples of tertiary amines containing isocyanate groups are isocyanate prepolymers containing tert.-amine atoms which are obtainable by reacting polyfunctional alcohols containing tert.-amine atoms with excess quantities of simple polyisocyanates of the kind exemplified hereinbefore. The polyvalent alcohols containing tert. amine atoms are either tert. amino alcohols which do not contain ether groups and which have a molecular weight of from about 119 to 400 as, for example, N-methyl-diethanol amine, N-ethyl-dipropanol amine, N-stearyl-diethanol amine or amino-alcohols containing ether groups having a molecular weight of from about 207 to 5700, preferably from about 300 to 4200 and which are obtainable by alkoxylating in known manner starters containing amine nitrogen atoms such as for example ethanol amine, propanol amine, diethanol amine, triethanol amine, dipropanol amine, tripropanol amine, ethyl amine, ethylene diamine or hexamethylene diamine using ethylene oxide and/or propylene oxide as alkoxylating agent.

Examples of organic tin salts preferably used in accordance with the invention are tin(II)-salts of carboxylic acids, such as tin(II)-acetate, tin(II)-octoate, tin(II)-ethyl hexanoate, tin(II)-oleate and tin(II)-laurate, and also tin(IV) compounds, such as dibutyl tin diacetate, dibutyl tin dilaurate, dibutyl tin maleate, dioctyl tin diacetate, dibtutyl tin di-2-ethyl hexanoate, tributyl tin acetate of 1,1,3,3-tetra-butyl-1,3-diacetoxy-distannoxane. The catalysts may be used either individually or in any combination, the combination of a tin salt with a tertiary amine often being preferred because synergism in regard to the catalytic activity is frequently observed in this case.

The production of the addition products of the sulfonyl isocyanates with the catalysts mentioned by way of example is carried out as described hereinafter in the description of the process according to the invention.

The auxiliaries and additives (c) optionally present in the polyisocyanate compositions according to the invention are known per se from polyurethane chemistry.

For example, the polyisocyanate compositions according to the invention may contain the organic blowing agents often used in the production of polyurethane foams, such as methylene chloride, chloroform, ethylidene chloride, vinylidene chloride, monofluorotrichloromethane, chlorodifluoromethane, dichlorodifluoromethane, butane, hexane, heptane or diethyl ether. In addition, it is possible to incorporate in the compositions according to the invention isocyanate-inert mold release agents of the type used in the production of self-releasing molded plastics based on polyurethanes. However, preferred additives (c) are, in particular, the additives known from adhesives and lacquer technology, such as solvent, for example toluene, xylene, ethylacetate, butylacetate, methyl ethyl ketone, methyl isobutyl ketone, ethylene glycol monoethyl ether acetate or mixtures of these solvents. These solvents are used in particular in cases where the polyisocyanate compositions according to the invention based on NCO-prepolymers are used as one-component adhesives and lacquers which harden spontaneously under the effects of atmospheric moisture. In addition, it is possible to incorporate, for example, other auxiliaries and additives known from lacquer technology, such as pigments, fillers, levelling aids and the like in the polyisocyanate compositions according to the invention.

The process for producing the polyisocyanate compositions may be carried out in several ways. In all these variants, however, formation of the addition products of the sulfonyl isocyanates with the catalysts mentioned by way of example preferably takes place at temperatures in the range of from about 0° to 80° C. and, about 10° to 30° C. using the two components of the addition products in such quantities that there is at least one isocyanato-sulfonyl group of the sulfonyl isocyanates for every amino group of the tertiary amines or every carboxylate anion of the tin salts. As will readily be appreciated, there is little point in using the sub-equivalent quantity of sulfonyl isocyanate because this would only result in partial blocking of the catalysts.

When tertiary amines are used which do not contain isocyanate groups, the process according to the invention is advantageously carried out as follows:

The tertiary amine is dissolved in the entire quantity of polyisocyanate component (a), followed by the addition with stirring of the sulfonyl isocyanate. Both the tertiary amine and also the sulfonyl isocyanate as well as the polyisocyanate component (a) may be used in solution in an inert solvent of the type mentioned by way of example. The solvent used, if any, may be removed, if desired, by distillation after the reaction between the tertiary amine and sulfonyl isocyanate. This reaction may of course also be carried out equally well using only part of the polyisocyanate component (a) as reaction medium. In that case, the reaction mixture would be mixed with the rest of the polyisocyanate component (a) after the reaction (formation of the addition compound). Different polyisocyanates of the type mentioned by way of example in the foregoing may of course be used for this purpose. In a less preferred variant, it is possible initially to introduce the sulfonyl isocyanate in the polyisocyanate component (a) or in part of the polyisocyanate component (a) or a solution thereof in an inert solvent of the type mentioned by way of example and then to stir the tertiary amine into the solution thus obtained. In that case, however, the addition compounds (b) are frequently precipitated whereas in the first and preferred variant, the same adducts remain in solution.

In another less preferred variant of the process, the addition compound may be prepared, for example, in an inert solvent by combining the individual components and subsequently mixing the resulting solution or dispersion of the addition compound (b) with the polyisocyanate component (a). Sedimenting dispersions of the addition compounds (b) are also frequently formed in this less preferred variant of the process, their sediments being readily redispersible simply by stirring. Stable solutions of the addition compounds (b) are of course preferred to the dispersions. The surprising observation that stable solutions are formed in the first and preferred variant of the process according to the invention may possibly be explained by the fact that, in the described production of the polyisocyanate compositions in situ, isocyanate groups of the polyisocyanate component (a) are added onto the addition compound (b), presumably present in the form of a betaine, and are thus responsible for the surprisingly good solubility of the addition compounds (b) prepared in situ.

When tertiary amines containing isocyanate groups (NCO-prepolymers) are used, the process according to the invention is advantageously carried out according to the following methods:

According to a first embodiment the tertiary amines containing isocyanate groups are reacted with sulphonyl isocyanate in accordance with the invention and the reaction product thus obtained is then mixed with component (a).

According to a second, more preferred embodiment a mixture is prepared containing the isocyanate component (a) and the tertiary amine containing isocyanate groups which mixture is then reacted with a sulphonyl isocyanate in accordance with the invention. Such mixtures of the polyisocyanate component (a) and NCO-prepolymers containing tert.-amine atoms are either (i) "NCO-semi-prepolymers" i.e. reaction products of polyvalent alcohols containing tert.-amine atoms of the kind exemplified hereinbefore with excess quantities (molar NCO/OH ratio greater than 2:1) of polyisocyanates of the kind exemplified hereinbefore or (ii) mixtures of NCO-prepolymers which do not contain amine groups of the kind exemplified hereinbefore with NCO-prepolymers containing tertiary amine groups which mixtures are obtained by reacting mixtures of polyhydroxyl compounds which do not contain tertiary amine groups and polyhydroxyl compounds which do contain tertiary amine groups, both of the kind exemplified hereinbefore, with excess quantities of polyisocyanates of the kind exemplified hereinbefore at a molar/OH ratio of greater than 1:1. In both embodiments the reaction may again be carried out in the presence of inert solvents.

In contrast to the addition compounds (b) based on the tertiary amines mentioned by way of example, the addition compounds (b) based on the tin compounds mentioned by way of example are satisfactorily soluble in organic media and hence in the polyisocyanate component (a) as well, irrespective of the method used for their production. Accordingly, where organic tin compounds of the type mentioned by way of example are used, polyisocyanate compositions according to the invention in which component (b) is present in dissolved form may be obtained with equal success by any of the variants described in the foregoing.

If tert. amines with molecular weights of 101–600 which do not contain isocyanate groups, and/or tin catalysts are used, the polyisocyanate component (a) and the individual components of component (b) are preferably used in such quantities that, based on the polyisocyanate component (a), the polyisocyanate compositions according to the invention contain from about 0.01 to 10% by weight, preferably from about 0.05 to 5% by weight of the catalysts, not including the weight of the sulfonyl isocyanate. When isocyanate groups containing tertiary amines with molecular weights of more than 600 are used, the polyisocyanate compositions may contain much more than 10% of the tertiary amines, depending from the increase in their molecular weight.

In all embodiments of the process of the invention the kind and quantity of the starting materials are selected so that, in the case of catalysts containing tert.amine atoms, the content of the polyisocyanate compositions of the invention of tertiary amine atoms (atomic weight=14) is from about 0.005 to 0.3% by weight and/or in the case of tin catalysts, the content of the polyisocyanate compositions of the invention of tin (atomic weight-118.7) is from about 0.008 to 8.0 preferably from 0.01 to 4.0% by weight.

The auxiliaries and additives optionally present in the polyisocyanate composition according to the invention are generally added to the compositions after the described production of the solutions or dispersions of component (b) in component (a). In principle, however, it is also possible to add the optional auxiliaries and additives to component (a) before the reaction according to the invention is carried out or before components (a) and (b) are mixed.

The addition compounds essential to the invention of tertiary amines and sulfonyl isocyanates are very probably betaines having the following structure:

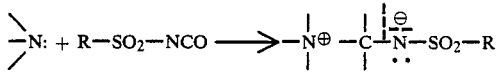

(cf. DAS No. 11 00 618 and Z. Brzozowski and W. Zackarewicz, Rocznik Chemi, 34, 1839 (1960)).

The structure of the addition compounds—essential to the invention—based on the tin catalysts is not known and may possibly be represented by the following tautomeric formulae:

Tin(II)-carboxylates:

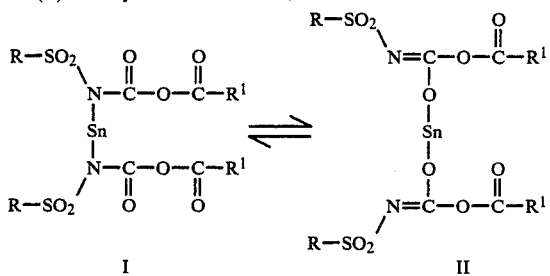

Tin(IV)-carboxylates

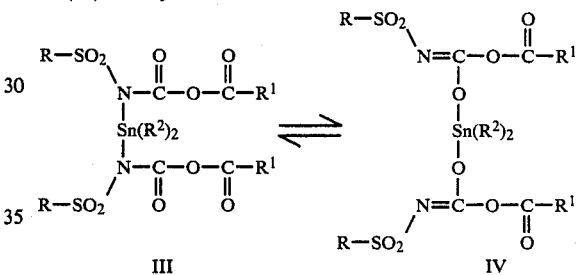

In these formulae, R represents the individual radical of the sulfonyl isocyanate, $R^1$ represents the individual radical of the carboxylate anion and $R^2$ represents the individual organic radicals of the tin(IV)-salts directly attached to the tin atom by covalent bonding.

The addition compounds essential to the invention are 1:1-adducts of the isocyanatosulfonyl groups onto the tertiary amino groups or the carboxylate anions. The addition compounds are extremely sensitive to hydrolysis and alcoholysis and are decomposed with release of the catalysts on contact with water (substrate or atmospheric moisture) and/or with compounds containing isocyanate-reactive groups, particularly hydroxyl groups. Prior to this hydrolytic or alcoholytic dissociation, the addition compounds essential to the invention are completely inert to isocyanate groups and do not bring about any secondary reactions affecting the stability of organic polyisocyanates in storage. Accordingly, the polyisocyanate compositions according to the invention are extremely interesting starting materials containing blocked catalysts for the production of isocyanate polyaddition products such as polyurethane plastics for example foams, elastomers, coatings or laminates. To this end, the polyisocyanate compositions according to the invention may be hardened with compounds containing isocyanate-reactive groups both on the one-component principle and on the two-component principle; in the former case, water (substrate or atmospheric moisture) generally represents the "compounds containing isocyanate-reactive groups." When the polyisocyanate compositions according to the invention are used in accordance with the invention on the two-component principle, it is possible to use the compounds containing isocyanate-reactive groups, particularly hydroxyl groups, known per se from polyurethane chemistry, of the type already mentioned by way of example in reference to the production of the NCO-prepolymers, and also any other standard auxiliaries and additives encountered in polyurethane chemistry. In these two-component systems, the polyisocyanate compositions according to the invention are used instead of the polyisocyanate component normally used. The polyisocyanate compositions according to the invention are of particular interest as, or for the production of, one-component system(s) crosslinkable under the effect of atmospheric moisture of the type used as adhesives or for surface lacquering or coating. The polyisocyanate compositions according to the invention are systems storable in the absence of moisture which, on contact with atmospheric moisture, harden almost as quickly as the corresponding prior-art systems containing non-blocked catalysts. In the production of polyisocyanate compositions according to the invention containing auxiliaries and additives, particularly solvents and/or pigments or fillers, this stability in storage may, if desired, be guaranteed by using an excess of sulfonyl isocyanate (based on the tertiary amine nitrogen atoms or the tin compounds) in order to "neutralize" any traces of moisture which may be present in the auxiliaries and additives (cf. U.S. Pat. No. 3,330,849 and in particular, U.S. Pat. No. 3,479,325).

In the following examples, all the percentages and parts quoted represent percentages by weight and parts by weight unless otherwise specified.

EXAMPLES

Example 1

Production of adducts of tertiary amines and sulfonyl isocyanates (Table 1)

General procedure for producing the crystallized addition compounds:

0.1 mole of the particular amine was introduced into 100 ml of anhydrous ethyl acetate, followed by the dropwise addition over a period of 15 minutes at 10° to 20° C. of sulfonyl isocyanate in an equimolar quantity, based on the tertiary amine nitrogen. A crystalline deposit was precipitated and filtered off under suction through a reversal frit, washed with approximately 25 ml of anhydrous ethyl acetate and then freed in vacuo from the remaining solvent.

In their crystallization form, compounds 1a-g were insoluble in aprotic, weakly polar organic solvents and in isocyanates, such as for example hexamethylene diisocyanate or 2,4-tolylene diisocyanate. Similarly, they were only sparingly soluble in chlorinated solvents such as methylene chloride and ketones such as methyl ethyl ketone, although a far greater proportion may be dissolved by carrying out adduct formation directly in the particular solvent, as shown in Example 2. The adducts, which were largely insoluble in solvents and also in organic polyisocyanates, may be dispersed in organic polyisocyanates to form polyisocyanate compositions corresponding to the invention (although less preferred).

TABLE 1

| Starting products | Adduct M.p. | Spectral data | Empirical formula and molecular weight | Elemental analysis (%) Obs.[a] Cal.[b] |
|---|---|---|---|---|
| 1a  11.2 g | TOSNCO[1] 39.4 g | 218° C. IR: C=O 1725 cm$^{-1}$ | $C_{22}H_{26}N_4O_6S_2$ (507) | N 11.1 11.1 S 12.5 12.7 |
| 1b 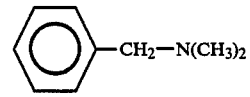 13.5 g | TOSNCO 19.7 | 95° C. $^1$H—NMR: (CDCl$_3$)[2] CH$_2$: 3.83 ppm S N(CH$_3$)$_2$: 2.5 ppm S Ar—CH$_3$: 2.36 ppm S | $C_{17}H_{20}N_2O_3S$ (132) | N 8.2 8.4 S 9.5 9.6 |
| 1c 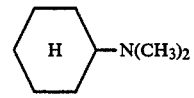 12.7 g | TOSNCO 19.7 | 99° C. IR (KBr): C=O:1740 cm$^{-1}$ IR(CHCl$_3$) C=O: 1665 cm$^{-1}$ | $C_{16}H_{24}N_2O_3S$ (324) | N 8.4 8.6 S 9.8 9.8 |
| 1d 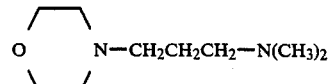 17.2 g | TOSNCO 39.4 | 127° | $C_{25}H_{34}N_4O_7S_2$ (566) | N 9.8 9.9 S 11.0 11.3 |
| 1e (CH$_3$)$_2$N—CH$_2$CH$_2$—N(CH$_2$CH$_2$—N(CH$_3$)$_2$)CH$_3$ (1)[3] | TOSNCO | IR(KBr): C=O: 1730 cm$^{-1}$ | $C_{33}H_{44}N_6O_9S_3$ (764) | N 12.5 12.6 S 11.9 11.0 |

TABLE 1-continued

| Starting products | Adduct M.p. | Spectral data | Empirical formula and molecular weight | Elemental analysis (%) Obs.[a] Cal.[b] |
|---|---|---|---|---|
| CH$_3$—N⟨ ⟩N—CH$_2$—CH$_2$—N(CH$_3$)$_2$ (4)[3]<br>17.2 g | 59.1 g | 135° C. | C$_{33}$H$_{42}$N$_6$O$_9$S$_3$ (762) | |
| 1f ⟨N N⟩<br>11.2 g | C$_6$H$_5$SO$_2$NCO<br>36.6 g | 140°C. | IR(KBr):<br>C=O: 1740 cm$^{-1}$ | C$_{20}$H$_{22}$N$_4$O$_6$S$_2$ (478) | N 11.7 11.7<br>S 13.4 13.4 |
| 1g ⟨N N⟩ | C$_8$F$_{17}$SO$_2$NCO | 183° C. | IR (NUJOL)<br>C=O: 1785 cm$^{-1}$ | C$_{24}$H$_{12}$F$_{34}$N$_4$O$_6$S$_2$ (1162) | N 5.0 4.8<br>S 5.9 5.5 |

Remarks:

[1] TOSNCO: CH$_3$—⟨C$_6$H$_4$⟩—SO$_2$—NCO

[a] Observed
[b] Calculated
[2] $^1$H—NMR—spectrum of the free benzyl—N—dimethylamine (CDCl$_3$):CH$_2$: 3.40 ppm S; N(CH$_3$)$_2$: 2.20 ppm
[3] Mixing ratio: 1:4

Example 2

Adducts of tertiary amines or tin carboxylates and p-toluene sulfonyl isocyanate in solution (Table 2)

General procedure:

The tertiary amine or the tin carboxylate was dissolved in the solvent indicated, the resulting solution was cooled to 10°–15° C. and the equivalent quantity of p-toluene sulfonyl isocyanate (tosyl isocyanate) was added at that temperature with gentle cooling. The exothermic addition reaction took place spontaneously. After all the tosyl isocyanate had been added, no more NCO-bands were present in the IR-spectrum (2240 cm$^{-1}$). The solutions of the adducts thus obtained were suitable for the production of polyisocyanate compositions according to the invention by mixing with organic polyisocyanates.

Example 3

Decomposition of the dissolved adducts by water 10 ml of solution 2a–e were shaken with 0.5 g of water. There was immediately a vigorous evolution of carbon dioxide which lasted for about 1 minute. Thereafter all the tosyl isocyanate was decomposed into tosyl amide and the amines or tin carboxylates were present in their free form.

TABLE 2

Composition of the solutions of catalyst and tosyl isocyanate

| Catalyst quantity | Tosyl isocyanate quantity | Solvent quantity | Concentration of the catalyst |
|---|---|---|---|
| (2a) cyclohexyl-N(CH$_3$)$_2$<br>5.0 g | 8.0 g | 87.0 g<br>Methylene chloride | 5% |
| (2b) (H$_3$C)$_2$N—CH$_2$—CH(CH$_3$)—N(CH$_3$)—CH$_2$—CH$_2$—N(CH$_3$)$_2$<br>5.0 g | 17.5 g | 77.5 g<br>Methyl ethyl ketone | 5% |
| (2c) (H$_3$C)$_2$N—CH$_2$—CH(CH$_3$)—N(CH$_3$)—CH$_2$—CH$_2$—N(CH$_3$)(1)[1] | 34.5 g | 55.5 g<br>Methyl ethyl ketone | 10% |

TABLE 2-continued

| Composition of the solutions of catalyst and tosyl isocyanate | | | |
|---|---|---|---|
| Catalyst quantity | Tosyl isocyanate quantity | Solvent quantity | Concentration of the catalyst |
| CH₃—N⌒N—N(CH₃)₂ piperazine structure (4)[1] 10.0 g | | | |
| (2d) Dibutyl tin dilaurate 10.0 g | 63. g | 83.7 g Butyl acetate | 10% |
| (2e) Tin(II)-octoate 5.0 g | 4.9 g | 90.1 g Methyl ethyl ketone | 5% |

[1]Mixing ratio = 1:4

Example 4

Decomposition of the crystalline adducts 1a–1g at room temperature by atmospheric moisture 1.0 g of the crystalline adducts 1a–g were left standing in the open on a watch glass at room temperature/50–55% air humidity, after which the crystal variation and reduction in weight were determined.

1d, 1e and 1f began to coalesce with foaming after 30 minutes and were completely decomposed after about 5 hours. The reduction in weight was only minimal (approximately 30 mg) by virtue of the highly hygroscopic behavior of the decomposition products.

The remaining compounds showed no (optically) discernible crystal changes even after 8 days. The products were powder-dry and showed the following weight losses:

| Compound: | 1a | 1b | 1c | 1g |
|---|---|---|---|---|
| Residual weight (g) | 0.931 | 0.823 | 0.827 | 0.996 |

Control test

Under the same conditions, 1.0 g of p-toluene sulfonyl isocyanate was completely decomposed after 20 minutes. The reduction in weight amounted to 40 mg. The stability of the addition products to moisture was thus generally far higher than that of pure tosyl isocyanate, which cannot be interpreted to mean that the addition products represent useful PUR-catalysts, i.e. PUR-catalysts which are rapidly activated by moisture.

The following Examples show that the adducts according to the invention, when dissolved or dispersed in an isocyanate system, behave like masked polyurethane catalysts and are rapidly unblocked by atmospheric moisture or, for example, by hydroxyl compounds.

The abbreviations used have the following meanings:

| Crude MDI: | 4,4′-diisocyanatodiphenyl methane in admixture with its isomers and higher homologs of the type obtained by phosgenating aniline-formaldehyde condensates, NCO-content: 30.4%, viscosity (25° C.): 80 mPa.s. |
|---|---|
| DBTL: | Dibutyl tin dilaurate. |
| Amine mixture: | 1:4 mixture of pentamethyl diethylene triamine and N—methyl-N′—(2-dimethyl-aminomethyl)-piperazine. |
| TOSNCO: | p-toluene sulfonyl isocyanate. |
| HDI: | Hexamethylene diisocyanate. |

In order to test the adhesive properties of the products, test specimens of glass fiber-reinforced polyester resin (30% glass content) measuring 2×4×0.3 cm were slightly roughened with glass paper and held for about 2 seconds over boiling water to enable the moisture required for the reaction to condense on the surface. After application of the adhesive, the test specimens were placed one on top of the other in such a way that an overlapped area of 2 cm$^2$ was obtained. The test specimens were then subjected to a pressure of 0.3 MPa. Shear strength was determined in accordance with DIN 53 283 (spindle advance 100 mm/minute) after the times indicated below.

To determine stability in storage, samples of adhesive were stored in tightly sealed 100 ml glass bottles at 23° C. and 50° C. until gelation occurred or for the maximum periods indicated.

To test film drying, a 200 m thick film was drawn onto a glass plate using a dumbbell and the point in time at which the coated surface was tack-free was manually determined. Conditions: 22°–24° C., 45–50% air humidity.

Example 5a 100 parts of an NCO-prepolymer having an NCO-content of 12.4% and a viscosity (25° C.) of 7500 mPa.s, which was obtained by reacting polypropylene glycol having an OH number of 56 with crude MDI in a quantity corresponding to the indicated NCO-content, was mixed with 0.2 part of DBTL and the resulting mixture intensively stirred in the absence of moisture at 20° C. with 0.13 part of TOSNCO to form a polyisocyanate composition according to the invention.

Comparison Example 5b 100 parts of the NCO-prepolymer of Example 5a were intensively stirred with 0.2 part of DBTL.

Example 6a

As Example 5a, but with 0.3 part of DBTL and 0.19 part of TOSNCO.

Comparison Example 6b 100 parts of the NCO-prepolymer of Example 5a were intensively stirred with 0.3 part of DBTL.

Example 7a 100 parts of the NCO-prepolymer of Example 5a were mixed with 0.2 part of amine mixture and the resulting mixture intensively stirred for 2 minutes in the absence of moisture at 20° C. with 0.7 part of TOSNCO to form a polyisocyanate composition according to the invention.

Comparison Example 7b 100 parts of the NCO-prepolymer of Example 5a were intensively stirred with 0.2 part of amine mixture.

Example 8a 100 parts of the NCO-prepolymer of Example 5a were mixed with 0.3 part of amine mixture dissolved in 10 parts of anhydrous methylene chloride. The methylene chloride was then completely distilled off again in vacuo at 30° C., followed by the addition over a period of 2 minutes in the absence of moisture at 20° C. of 1.1 part of TOSNCO. The solution clouds and a finely disperse solid was precipitated, sedimenting slowly after 2 days.

Comparison Example 8b 100 parts of the NCO-prepolymer of Example 5a were intensively stirred with 0.3 part of amine mixture dissolved in 10 parts of anhydrous methylene chloride, after which the methylene chloride was completely removed again in vacuo at 30° C.

Example 9a 100 parts of the NCO-prepolymer of Example 5a were mixed with 0.1 part of amine mixture and the resulting mixture intensively stirred in the absence of moisture at 20° C. with 0.4 part of TOSNCO. After 5 minutes, 0.25 part of DBTL was added and another 0.17 part of TOSNCO was mixed in.

Comparison Example 9b 100 parts of the NCO-prepolymer of Example 5a were intensively stirred with 0.1 part of amine mixture and 0.25 part of DBTL.

The samples of Examples 5a to 9a and of the corresponding Comparison Examples and also the uncatalyzed NCO-prepolymer of Example 5a were tested for their adhesive properties. The shear strengths determined are set out in Table 3. In addition, the stability of the products in storage was tested (Table 4). The mixtures according to the invention remain stable for more than 6 months when stored at room temperature (20° to 25° C.).

TABLE 3

| Shear strengths (in N/mm$^2$) after: | 30' | 60' | 120' | 24 h |
|---|---|---|---|---|
| Example (5a) (Control: uncatalyzed): | — | — | — | 8.5 |
| Example (5a): | 7.5 | 8.0 | 8.5 | 9.6* |
| Comparison Example (5b): | 5.0 | 7.5 | 8.5 | 10.0* |
| Example (6a): | 7.5 | 7.5 | 8.2 | 9.8* |
| Comparison Example (6b): | 6.0 | 8.5 | 8.5* | 10.4* |
| Example (7a): | — | — | 1.5 | 10.2* |
| Comparison Example (7b): | — | — | 1.5 | 9.8* |
| Example (8a): | — | — | 1.5 | 9.6* |
| Comparison Example (8b): | — | — | 1.5 | 10.2* |
| Example (9a): | 2.1 | 4.1 | 6.0 | 10.2* |

TABLE 3-continued

| Shear strengths (in N/mm$^2$) after: | 30' | 60' | 120' | 24 h |
|---|---|---|---|---|
| Comparison Example (9b): | 3.0 | 6.0 | 7.2 | 10.6* |

Note: *with delamination

TABLE 4

Stability in storage (A: at 23° C.; B: at 50° C.) (the period indicated is the period up to gelation or the minimum stability which, where appears, can be considerably longer).

| | |
|---|---|
| Example (5a) (control: uncatalyzed) | A: >6 months<br>B: >6 months |
| Example (5a) | A: >6 months<br>B: approx 4 months |
| Comparison Example (5b) | A: approx 5 months<br>B: approx 1 month |
| Example (6a) | A: >6 months<br>B: 2.5 months |
| Comparison Example (6b) | A: 15 days<br>B: 10 days |
| Example (7a) | A: >6 months<br>B: >6 months |
| Comparison Example (7b) | A: 5-6 months<br>B: 3-4 months |
| Example (8a) | A: >6 months<br>B: >6 months |
| Comparison Example (8b) | A: approx 5 months<br>B: 40 days |
| Example (9a) | A: >6 months<br>B: 30 days |
| Comparison Example (9b) | A: 10 days<br>B: 3 days |

Example 10

An NCO-prepolymer having an NCO content of 11.9% and a viscosity (25° C.) of 6700 mPa.s was obtained by reacting crude-MDI with a polyether glycol having an OH number of 56 and a content of ethylene oxide units of 50% by weight, 60% of whose hydroxyl groups are primary hydroxyl groups and which had been obtained by the alkoxylation of propylene glycol with a mixture of propylene oxide and ethylene oxide. 100 parts of the NCO-prepolymer were mixed with 0.5 part of DBTL and the resulting mixture intensively stirred in the absence of moisture at 20° C. with 0.32 part of TOSNCO. In a tightly sealed container at 23° C., the mixture was unchanged, even after storage for 6 months, whereas in the absence of TOSNCO the product gelled after 18 days. Testing of the adhesive properties produced the following shear strengths (in N/mm$^2$):

| after | 30' | 3.7 |
|---|---|---|
| | 60' | 7.0 |
| | 120' | 8.2 |
| | 24 h | 9.6 (with delamination) |

Film drying: 6:30 hours:minutes (identical with free DBTL).

Control:
The NCO—prepolymer NCO-prepolymer had the following shear strengths (in N/mm$^2$):

| after | 30' | 2.6 |
|---|---|---|
| | 60' | 3.0 |
| | 120' | 4.8 |
| | 24 h | 9.4 (with delamination) |

Film drying: >12 hours

Example 11

100 parts of the NCO-prepolymer of Example 10 were stirred in the absence of moisture at 20° C. with 5.0 parts of solution 2d of Example 2, after which the solvent (butyl acetate) was completely distilled off again in vacuo at 50° C. Stability in storage and shear strengths corresponded to those of Example 10.

Example 12

100 parts of the NCO-prepolymer of Example 10 were mixed in the absence of moisture at 20° C. with 0.5 part of amine mixture and the resulting mixture was intensively stirred with gentle cooling at 15°–20° C. with 1.8 part of TOSNCO. The clear solution remained stable in storage for a minimum of 6 months at 23° C. The shear strengths determined corresponded to the shear strength of the NCO-prepolymer of Example 10.
Film drying: 6 hours (uncatalyzed: >12 hours).
Film drying: (without TOSNCO): 35 minutes.

Examples 10 and 12 show that the "amine mixture" produces more rapid hardening in the film than DBTL whereas DBTL leads to improved adhesive properties (shear strength). The same result was obtained in Examples 5 to 8.

Example 13

100 parts of the NCO-prepolymer of Example 10 were stirred in the absence of moisture at 20° C. with 5.0 parts of solution 2c of Example 2, after which the solvent was removed in vacuo at 50° C. A fine deposit crystallized out from the mixture, settling as a sediment. This sediment may be redispersed simply by shaking and/or stirring. Stability in storage remained unaffected.

Example 14

100 parts of the NCO-prepolymer of Example 10 were stirred for 12 hours in the absence of moisture at 40° C. with 2.3 parts of the crystalline adduct 1e of Example 1. The product 1e remained completely insoluble and precipitated as a finely crystalline deposit. Stability in storage remained unaffected.

Examples 12 to 14 show that, to produce polyisocyanate compositions according to the invention based on tertiary amines, it is advisable to adopt the preferred procedure (production of the addition compounds in the polyisocyanate) to obtain stable solutions, whereas Example 11 shows that, in the case of tin compounds, any of the variants may be adopted.

Example 15

An NCO prepolymer having an NCO content of 11.9% and a viscosity (25° C.) of 7350 mPa.s was obtained by reacting a 1:1 mixture of a polypropylene glycol having an OH number of 56 and the polyether glycol of Example 10 with crude-MDI. 100 parts of the NCO-prepolymer were mixed with 0.5 part of DBTL and the resulting mixture was intensively stirred in the absence of moisture at 20° C. with 0.32 part of TOSNCO.

The stability of the mixture in storage corresponded to that of Example 10.

Testing of the adhesive properties produced the following shear strengths (in N/mm$^2$):

| after | 30' | 4.0 |
|---|---|---|
| | 60' | 6.0 |
| | 120' | 7.2 |
| | 24 h | 10.0 (with delamination). |

The uncatalyzed NCO-prepolymer had the following shear strengths (in N/mm$^2$):

| after | 30' | — |
|---|---|---|
| | 60' | 5.5 |
| | 120' | 7.0 |
| | 24 h | 10.2 (with delamination). |

A comparison of Examples 5, 10 and 15 showed that a certain content of ethylene oxide groups in the polyether makes for improved adhesive properties.

Example 16

0.44 part of a 1:2-adduct of DBTL and TOSNCO, prepared beforehand in anhydrous methylene chloride from 0.6 part of DBTL and 0.38 part of TOSNCO as in Example 2 and by distilling off the methylene chloride in vacuo at 30° C., were added in the absence of moisture to 100 parts of a polyurethane polymer containing aliphatic isocyanate groups which had an NCO-content of 9.5% in the form of a 60% solution in ethyl glycol acetate/xylene (4:1) and which had been prepared from a biuret polyisocyanate based on hexamethylene diisocyanate having an NCO-content of 22% and a hydroxyl-containing polyester polyol having an OH number of 66 and based on phthalic acid anhydride and trimethylol propane. The adduct was clearly soluble. Stability in storage was greater than 6 months. After the same period, a TOSNCO-free comparison product had undergone a distinct increase in viscosity and could no longer be processed.

Film drying: 5 hours
Film drying: (TOSNCO-free comparison product): 5 hours
Control:
Film drying: (uncatalyzed): >24 hours Example 17

0.5 part of DBTL were added in the absence of moisture to 100 parts of crude-MDI and the resulting mixture stirred at 20° C. with 0.36 part of p-isocyanatophenyl sulfonyl isocyanate. The clear mixture remained stable in storage for more than 6 months. By contrast, the unblocked comparison product had completely thickened after that period.

Example 18

100 parts of a polyol mixture containing auxiliaries and additives were added to 40 parts of the crude MDI of Example 17 to which blocked DBTL had been added and which had been stored at room temperature (for 3 months). The polyol mixture contained:
50 parts of a polyether polyol having an OH number of 380 produced by the propoxylation of trimethylol propane,
20 parts of a polyether polyol having an OH number of 112 produced by the propoxylation of propylene glycol,
30 parts of castor oil,
100 parts of chalk,
10 parts of standard commercial zeolite paste and
4 parts of a standard commercial deaerating agent.

The NCO/OH ratio was 1:1. The mixture thus prepared was solid after 1 minute. The same short pot life was obtained when unblocked DBTL (0.5%, based on crude-MDI) was used. In the absence of catalyst, however, the pot life amounted to 120 minutes.

This example shows that the tin salt blocked in accordance with the invention may on the one hand be combined with a polyisocyanate to form a storable solution and, on the other hand, immediately develops its catalytic activity on contact with compounds containing hydroxyl groups.

In addition to the abbreviations used above, the following abbreviations are used in the following examples:

| TDI 100 | 2,4-diisocyanatotoluene |
|---|---|
| TDI 80 | a mixture of 80% of 2,4- and 20% of 2,6-diisocyanatotoluene |
| TDI 65 | a corresponding mixture in a ratio of 65:35. |

Example 19a 1.0 g of N,N-dimethyl cyclohexylamine was added in the absence of moisture to 100 g of TDI 100, followed by the addition at 25° C. of 1.6 g of TOSNCO. A clear solution was formed. However, the adduct formed slowly crystallized out therefrom after 48 hours. The supernatant 2,4-TDI remained unchanged after a storage period of 6 months. The sediment may be redispersed simply by shaking and/or stirring.

Example 20a 20 g of solution 2a of Example 2 were added in the absence of moisture to 100 g of TDI 100, after which the solvent was completely distilled off again in vacuo at 40° C. A clear, yellow solution was obtained, the catalyst adduct slowly crystallized out therefrom after about 3 days. The supernatant 2,4-TDI remained unchanged after a storage period of 6 months.

Comparison Examples 19b and 20b 1.0 g of N,N-dimethyl cyclohexyl amine were added to 100 g of TDI 100. The clear solution had polymerized completely after 24 hours and was as hard as "rock."

Example 21a 0.6 g of tin(II)-octoate were added in the absence of moisture at 10° C. to 0.62 g of TOSNCO, followed by stirring for 10 minutes. 100 g of TDI 100 were then mixed in at 25° C. A clear solution was obtained which remained stable for months when stored at 30° C.

Comparison Example 21b 0.6 g of tin(II)-octoate were added in the absence of moisture to 100 g of TDI 100. A clear solution was obtained from which a white deposit flocculated out after 24 hours and which polymerized after 2 months, turning yellow in color.

Example 22

0.68 g of the solid complex 1a of Example 1 were suspended in 15 g of TDI 100.

Example 23

0.64 g of the solid complex 1f of Example 1 were suspended in 15 g of TDI 100.

Example 24

1.55 g of the solid complex 1 g of Example 1 were suspended in 15 g of TDI 100.

The mixtures of Examples 22 to 24 remained stable for more than 6 months. The adducts 1a, f and g were completely inert solids present in the form of insoluble sediments which may be dispersed by shaking and/or stirring. The corresponding quantity of free diethylene triamine (0.15 g to 15 g of TDI 100) led to polymerization of TDI 100 in 24 hours. For the swelling test described in Table 5, the mixtures were homogenized by intensive shaking.

Example 25a 1.0 g of bis-2-(dimethylamino)-ethyl ether was dissolved in 10 ml of anhydrous methylene chloride and the resulting solution was mixed at 25° C. with 100 g of crude-MDI. 2.7 g of TOSNCO were then added, followed by stirring at 25° C. The solvent was then completely distilled off again in vacuo at 30° C. In the absence of moisture, the solution formed remained stable in storage for 6 months.

Comparsion Example 25b 1.0 g of bis-2-(dimethylamino)-ethyl ether was dissolved in 10 ml of anhydrous methylene chloride and the resulting solution was mixed with 100 g of crude-MDI. The solvent was then completely distilled off again in vacuo at 30° C. The solution showed clear signs of thickening after 6 weeks and, after 6 months, was polymerized.

Example 26a 1,0 g of bis-(3-dimethylamino-propyl)-amine was stirred for 10 minutes at 20° C. with 1.1 g of TOSNCO in 10 ml of anhydrous $CH_2Cl_2$. 100 g of crude-MDI were added to the resulting solution, followed by the addition at 25° C. of 2.3 g TOSNCO. The mixture was freed from the solvent in vacuo at 30° C. When stored in the absence of moisture, it remained unchanged, even after 6 months.

Example 27a 1,0 g of bis-(3-dimethylamino-propyl)-amine was dissolved in 10 ml of anhydrous $CH_2Cl_2$ and the resulting solution was stirred for 5 minutes at 20° C. with 100 g of crude-MDI. 2.5 g of TOSNCO were then added and the solvent was completely distilled off in vacuo at 30° C. The mixture remained stable in storage for 6 months.

Comparison Examples 26b and 27b 1,0 g of bis-(3-dimethylamino-propyl)-amine was dissolved in 100 g of crude MDI. The mixture had clearly thickened after 2 months and, after 6 months, had completely polymerized.

Example 28

Swelling test with the mixtures of Examples 19 to 27 and of the corresponding Comparison Examples (Table 5).

General Procedure

A trifunctional polyether having an OH number of 380, produced by the propoxylation of trimethylol propane (polyol), was added in the quantity indicated in the Table to the specified quantity of the polyisocyanate mixture of the respective Examples and the time taken to reach the solidification point and also the maximum temperature reached were determined. If the mixture remained viscous, only the maximum temperature was determined. Testing was carried out 30 minutes after the preparation of the respective solutions.

TABLE 5

| | Swelling test (NCO:OH equivalent ration = 1) | | | | |
|---|---|---|---|---|---|
| | Polyisocyanate | Polyol | $T_{max}$ | After time (mins:sec) | Solid after (min:sec) |
| Example (19a) | 30 g | 50 g | 100° C. | 12:04 | — |
| Example (20a) | 30 g | 50 g | 103° C. | 9:30 | 9:30 |
| Example (19b) | 30 g | 50 g | 129° C. | 5:15 | 5:15 |
| Example (20b) | | | | | |
| Example (21a) | 30 g | 50 g | 131° C. | 4:15 | 0:10 |
| Example (21b) | 30 g | 50 g | 135° C. | 4:30 | 0:10 |
| Standard[1] | 30 g | 50 g | 93° C. | 16:45 | — |
| Example 22 | 15 g | 25 g | 82° C. | 10:45 | 10:45 |
| Example 23 | 15 g | 25 g | 102° C. | 6:35 | 4:30 |
| Example 24 | 15 g | 25 g | 65° C. | 13:45 | — |
| Standard[1] | 15 g | 25 g | 68° C. | 13:50 | — |
| Example (25a) | 46 g | 50 g | 107° C. | 14:00 | 14:00 |
| Example (25b) | 46 g | 50 g | 95° C. | 9:15 | 7:10 |
| Example (26a) | 46 g | 50 g | 85° C. | 25:00 | 25:00 |
| Example (27a) | 46 g | 50 g | 85° C. | 25:10 | 20:00 |
| Example (26b) | 46 g | 50 g | 100° C. | 21:35 | 14:45 |
| Example (27b) | | | | | |
| Standard[1] | 46 g | 50 g | 41° C. | 70:00 | — |

Note: [1]uncatalyzed

Comparison of Examples 19, 20, 25, 26 and 27 with the corresponding Comparison Examples (Table 5) shows that the blocked tertiary amines are not quite as quick as the free catalysts in the swelling test (deblocking not through the reactive H₂O), but are distinctly higher in their catalytic activity than the uncatalyzed standard.

Example 29

0.05 part of DBTL and then 0.04 part of TOSNCO were added at 25° C. in the absence of moisture to 100 parts of TDI 80. The clear solution remained stable in storage for more than 6 months.

Example 30

99 parts of a modified crude-MDI having an isocyanate content of 24,5%, prepared by reacting crude-MDI with a mixture of di- and tripropylene glycol (weight ratio=1:1), were stirred in the absence of moisture at 25° C. with 0.6 part of DBTL, followed by the addition of 0.4 part of TOSNCO. The solution remained stable in storage for more than 6 months.

Example 31

Production of flexible polyurethane foam using a complex of DBTL and tosyl isocyanate dissolved in a mixture of TDI 80 and crude-MDI for catalysis To compare the activity of the catalyst, three samples differing solely in the use of DBTL were foamed: the first contained no DBTL; the second contained DBTL in the polyol formulation (prior art); the thrid contained the same quantity of DBTL, but it was dissolved in the isocyanate as a tosyl isocyanate complex according to the invention.

The polyether formulation was mixed with the isocyanate at room temperature in a ratio of 100:37.1, corresponding to an index of 100. The cream time, fiber time, rise time and the maximum rate of rise of the free foams were compared. The mechanical properties of the foams were determined on 10 liter moldings (20×20×25 cm).

| Formulation constituents: | Form I | II | III |
|---|---|---|---|
| | (parts by weight) | | |
| Polyether formulation | | | |
| (a) A trifunctional polyether, OH number 28, produced by the propoxylation and subsequent ethoxylation (ethylene oxide content 13%) of trimethylol propane | 80 | 80 | 80 |
| (b) The same trifunctional polyether as (a), but with 17.5% of ethylene oxide and 20% of organic filler (polyhydrazo-carbonamide) | 20 | 20 | 20 |
| (c) Water | 3.1 | 2.1 | 3.1 |
| (d) Bis-2-(dimethylamino)-ethyl ether | 0.1 | 0.1 | 0.1 |
| (e) 1,4-diazabicyclo-(2,2,2)-octane in the form of a 33% solution in isopropanol | 0.4 | 0.4 | 0.4 |
| (f) N—(3-dimethylaminopropyl)-formamide | 0.5 | 0.5 | 0.5 |
| (g) Polysiloxane stabilizer | 1.0 | 1.0 | 1.0 |
| (h) DBTL | — | 0.05 | — |
| Isocyanate formulation | | | |
| TDI 80 | 80 | 80 | — |
| Crude MDI | 20 | 20 | 20 |
| Example 29 | — | — | 80 |

| | Foaming rate | | | | |
|---|---|---|---|---|---|
| Formulation | Cream time s | Fiber time s | Rise time s | Rise height mm | maximum rate of rise mm/s |
| I | 5 | 57 | 136 | 157 | 2.9 |
| II | 4 | 45 | 107 | 174 | 4.5 |
| III | 4 | 43 | 110 | 184 | 4.6 |

| | Mechanical properties: | | |
|---|---|---|---|
| Formulation | I | I | III |
| Gross density, kg/m³ DIN 53420 | 40 | 40.5 | 41.5 |
| Compression hardness, kPa DIN 53577, = 40% | 3.0 | 2.0 | 3.0 |
| Tensile strength, kPa DIN 53571 | 125 | 155 | 150 |
| Breaking elongation, % DIN 53571 | 160 | 200 | 190 |
| Tear propagation resistance, KN/m ASTM-D 1564-71 T | 0.27 | 0.33 | 0.47 |

| -continued | | | |
|---|---|---|---|
| Compression set, %<br>DIN 53572, = 75%,<br>70° C., 24 h | 5.6 | 7.7 | 7.4 |

Example 32

Production of a semi-rigid integral polyurethane foam using a polyisocyante composition according to the invention.

Component A 100 parts of a polyether polyol, OH number 35, produced by the propoxylation of trimethylol propane and subsequent ethoxylation of the propoxylation product using 15% of ethylene oxide, based on the total quantity of alkylene oxides;
9 parts of ethylene glycol;
14 parts of trichlorofluoromethane.

Component B 62 parts of the polyisocyanate preparation according to Example 30.

In a preliminary test, components A and B were mixed for 10 seconds using a high-speed laboratory stirrer. The reaction mixture thus obtained had a cream time (time from the beginning of stirring to the beginning of foaming) of 14 seconds, a rise time (time from the beginning of stirring to the end of the rising process) of 20 seconds and a gel time (time from the beginning of stirring to setting of the foam) of 23 seconds.

To produce a semi-rigid integral foam, 320 g of a reaction mixture prepared as in the first test were introduced in a second test into a closed metal mold measuring 20×20×4 cm. The inner walls of the metal mold had been coated beforehand with a standard commercial mold-release agent. After a residence time in the mold of 4 minutes, a molding having the following mechanical properties was removed from the mold:

| Gross density in the cellular core<br>(DIN 53420) | 135 kg/m³ |
|---|---|
| Compression hardness (DIN 53577) | 26 kPa |
| Tensile strength (DIN 53571) | 400 kPa |
| Breaking elongation (DIN 53571) | 180% |
| Compression set (DIN 53572, Y = 50%) | 20% |

Example 33

Comparison of various sulfonyl isocyanates in regard to resplitting activity during drying of the fillm:

250 g of an NCO-prepolymer produced from polypropylene glycol, OH number 56, and crude MDI which had an NCO content of 9.6% in the form of an 80% solution in methyl ethyl ketone, were stirred in the absence of moisture with 2.5 g of N,N-dimethyl cyclohexylamine. The solution was then divided up into 5 portions of 50 g to which the quantities of sulfonyl isocyanate indicated below were added in the absence of moisture:

(a) no addition of sulfonyl isocyanate
(b) 0.8 g of TOSNCO
(c) 0.75 g of phenyl sulfonyl isocyanate
(d) 2.1 g of perfluorooctyl sulfonyl isocyanate
(e) 0.6 g of chlorosulfonyl isocyanate.

30 minutes after their preparation, a film was drawn from the clear solutions (hardening conditions: 32° C./60% air humidity):

(a) 0:32 hours:minutes
(b) 0:50 hours:minutes
(c) 0:55 hours:minutes
(d) 4:20 hours:minutes
(e) 4:20 hours:minutes
(f) (uncatalyzed) 6:25 hours:minutes.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

Example 34

40 parts of diphenyl-cresyl-phosphate were added to 160 parts of crude-MDI having an isocyanate content of 33,1% and containing 20% of 2,4′-diisocyanato-diphenylmethane. Subsequently 144 parts of a molten (60° C.) polyester polyol having an OH-number of 66 obtained by reacting adipic acid with a mixture of 1,6-dihyroxy-hexane and neopentyl glycol (weight ratio=9:1) were added to said mixture. Subsequently 56 parts of a polyether polyol (OH-number=150) obtained by propoxylation of triethanol amine were added to the reaction mixture. Upon the addition of the amino polyether the temperature of the reaction mass rose to 50° C. The reaction mixture was stirred for 1 hour at this temperature until the NCO-content of 9,9% was reached. Subsequently the reaction mixture was cooled to room temperature. Upon storage for 24 hours at room temperature the NCO-content of the reaction mixture was 9,0%. The storage stability at room temperature of the polyisocyanate composition thus obtained was found to be 53 days (gel formation).

In a parallel experiment the isocyanate prepolymer described hereinbefore having an isocyanate content of 9,9% was stirred for 1 hour at 30° C. Thereafter 10,8 g of TOSNCO were added. Upon storage for 24 hours at room temperature the NCO-content of the mixture was found to be 9,7%. The polyisocyanate composition thus obtained remained unchanged upon storage for 180 days.

Example 35

5 parts of a polyether polyol having an OH-number of 490, prepared by propoxylation of ethylene diamine and which were dissolved in 5 parts of ethyl acetate were added to 400 parts of an NCO-prepolymer prepared from 3 moles of 2,4-diisocyanate toluene and 1 mole of trimethylol propane dissolved as 75% solution in ethyl acetate (NCO-content of the solution=13%). The mixture was stirred for 1 hour until an NCO-content of 11,5% was reached. One half of the reaction product is then amixed with 4,3 g of TOSNCO. The storage stability of both mixtures (until gel formation takes place) was found to be 9 days for the sample which did not contain TOSNCO and 122 days for the sample which was admixed with TOSNCO.

What is claimed is:

1. A polyisocyanate composition containing a reversibly blocked catalyst for the isocyanate addition reaction which comprises
    (a) at least one organic polyisocyanate and
    (b) at least one addition product dissolved or dispersed in the polyisocyanate composition, of a sulfonyl isocyanate with a catalyst having a tin(II)- or tin(IV)-carboxylate structure as the reversibly blocked catalyst.

2. The polyisocyanate compostion of claim 1 wherein component (b) contains a tin catalyst, said tin catalyst, not including the weight of said sulfonyl isocyanate, being present in a quantity of from about 0.01 to 10% by weight based on the weight of polyisocyanate component (a).

3. The polyisocyanate composition of claim 1 wherein the amount of component (b) is selected to provide a content of about 0.008 to 8% by weight of tin, based on the weight of said polyisocyanate composition.

4. The polyisocyanate composition of claim 1 wherein said organic polyisocyanate of component (a) is a prepolymer containing terminal isocyanate groups and having an average molecular weight of from about 400 to 10,000 and an NCO-content of from about 2.5 to 25% by weight.

5. The polyisocyanate composition of claim 3 wherein said organic polyisocyanate of component (a) is a prepolymer containing terminal isocyanate groups and having an average molecular weight of from about 400 to 10,000 and an NCO-content of from about 2.5 to 25% by weight.

6. The polyisocyanate composition of claim 1 characterized in that said sulfonyl isocyanate of component (b) is a compound containing at least one aromatically bound isocyanatosulfonyl group.

7. The polyisocyanate composition of claim 3 characterized in that said sulfonyl isocyanate of component (b) is a compound containing at least one aromatically bound isocyanatosulfonyl group.

8. The polyisocyanate composition of claim 4 characterized in that said sulfonyl isocyanate of component (b) is a compound containing at least one aromatically bound isocyanatosulfonyl group.

9. The polyisocyanate composition of claim 5 characterized in that said sulfonyl isocyanate of component (b) is a compound containing at least one aromatically bound isocyanatosulfonyl group.

10. A reversibly blocked polyurethane catalyst which is the addition product of a sulfonyl isocyanate with a catalyst having a tin(II)- or tin(IV)-carboxylate structure in an equivalent ratio of isocyanatosulfonyl groups to carboxylate anion of 1:1.

* * * * *